INVENTORS
LEO O. DONAHUE
ROY E. BEHRENS
By Herbert E. Kidder
AGENT

United States Patent Office 3,605,980
Patented Sept. 20, 1971

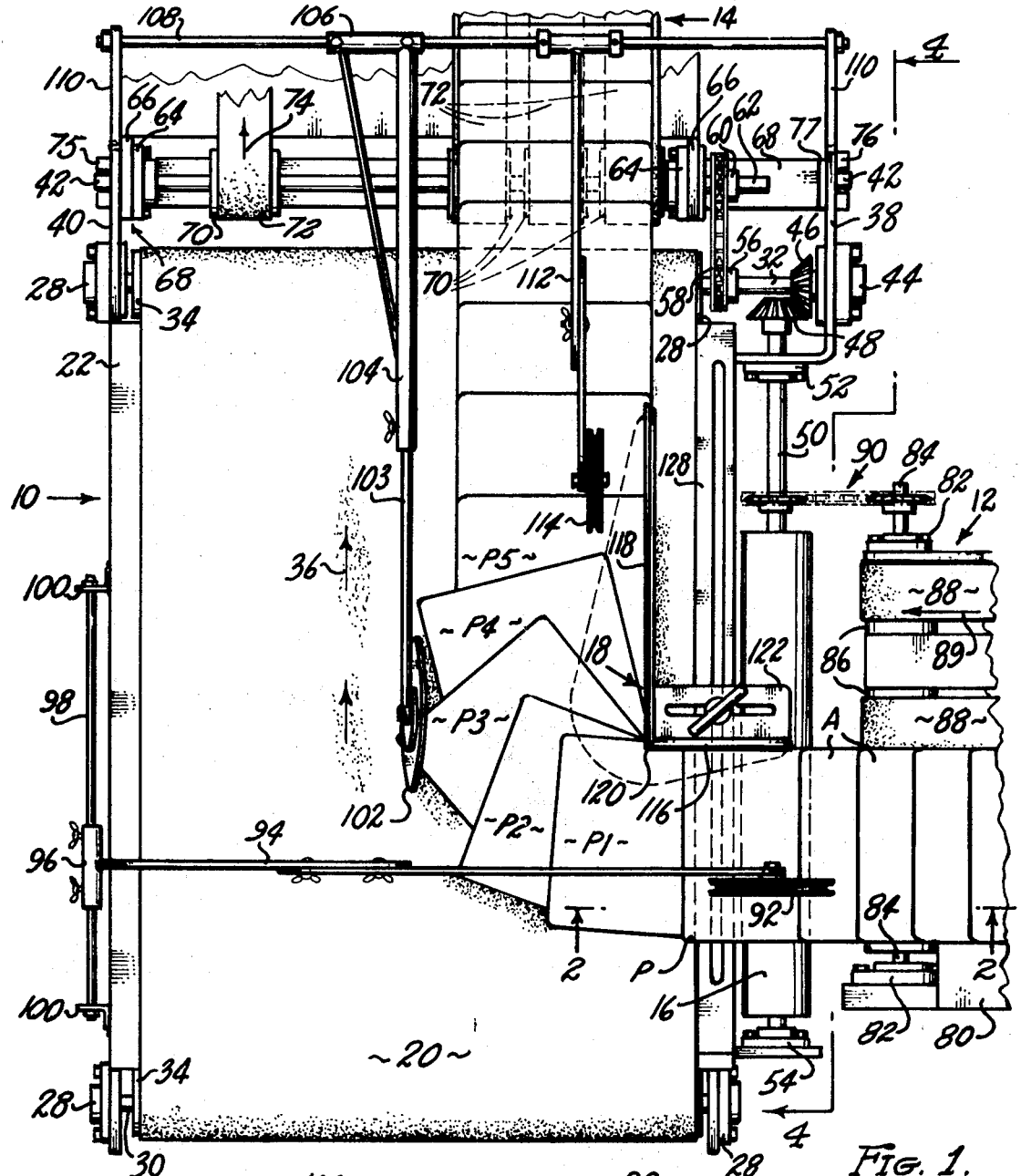
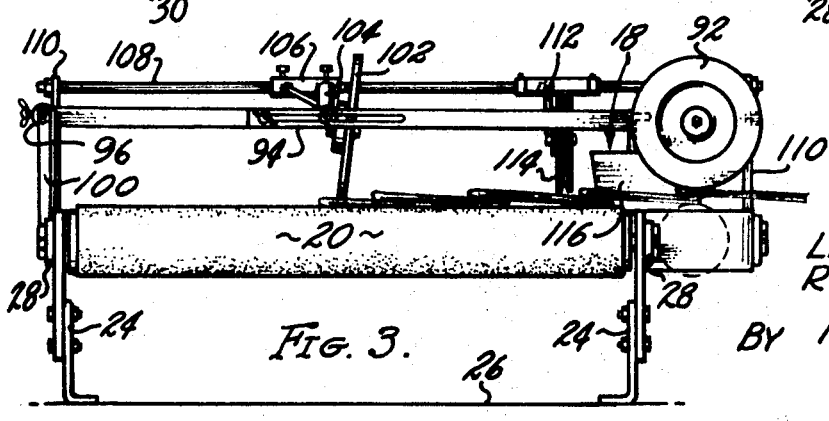

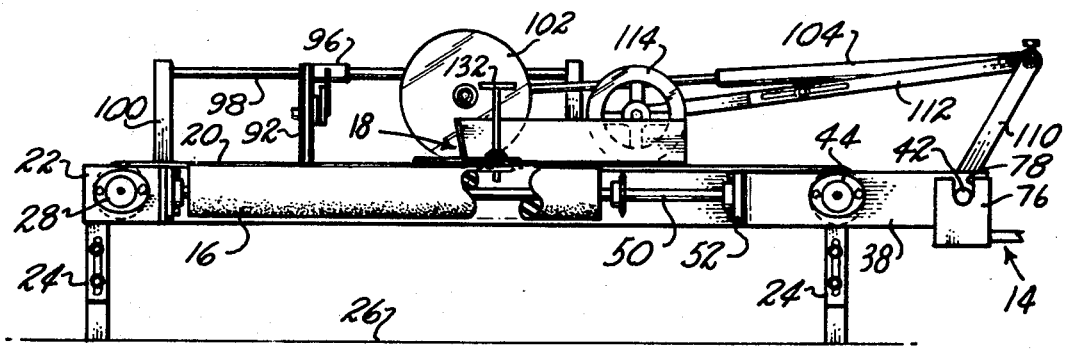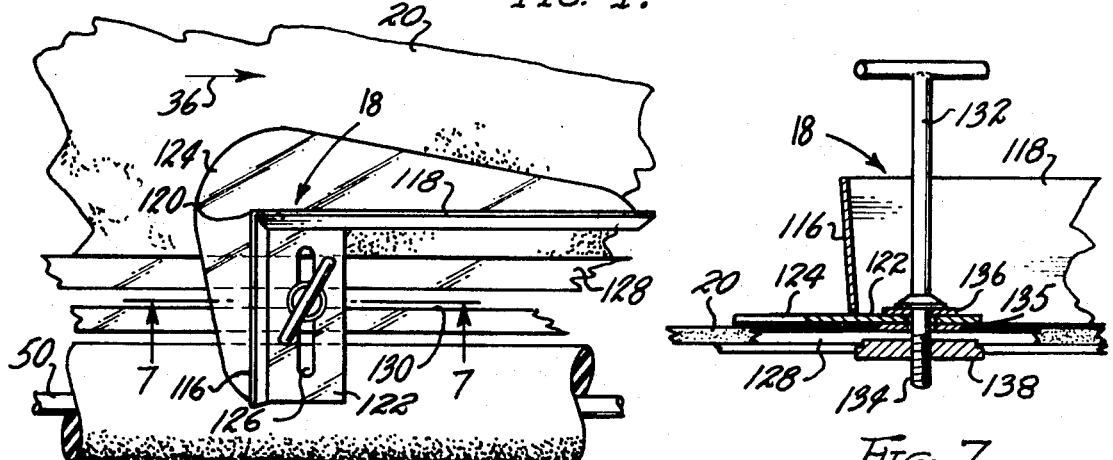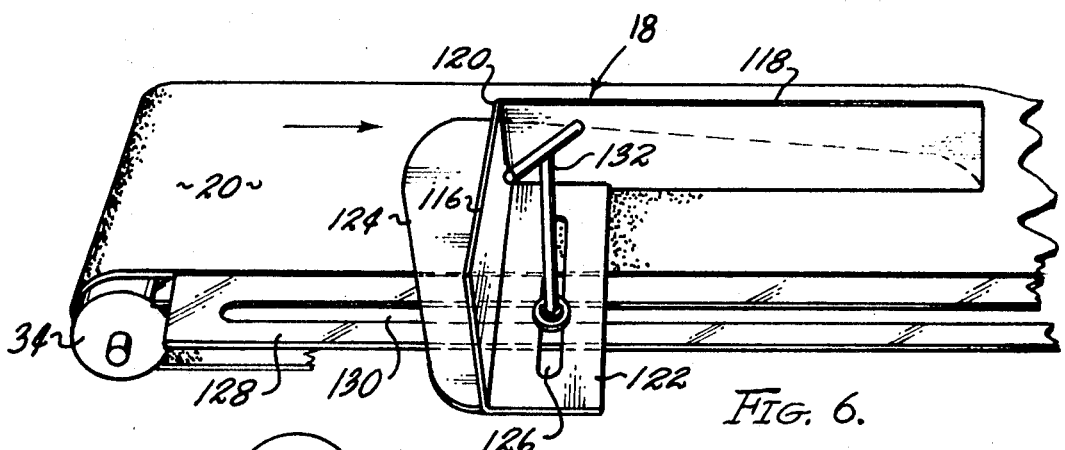

3,605,980
TURNING CONVEYOR
Leo O. Donahue and Roy E. Behrens, Highland, Calif., assignors to Graphic Engineers, Inc., San Bernardino, Calif.
Filed Aug. 12, 1969, Ser. No. 859,608
Int. Cl. B65g 47/00
U.S. Cl. 198—20               10 Claims

ABSTRACT OF THE DISCLOSURE

Apparatus comprising a belt conveyor and fulcrum device for receiving a line of overlapping "shingled" papers from a delivery conveyor and transporting them around a right-angle corner, during which the papers fan out and then return to shingle condition. The papers are propelled onto the belt conveyor in sequence to dispose at least the leading half of each paper ahead of the corner, whereupon the pull of the belt conveyor initiates turning of the paper thereabout. Means are provided for pressing the papers against the belt conveyor for better traction to bring the papers up to the belt speed for accelerating turning thereof and aligning the papers with the direction of movement of the belt conveyor.

BACKGROUND OF THE INVENTION

The present invention relates to conveyors, and more particularly to a new and improved belt-conveyor apparatus for receiving a continuous line of overlapping "shingled" papers from a first machine, transporting them around a right-angle corner, during which the shingle spacing is increased and the papers fan out, and delivering them in shingle condition to a second machine. The invention is particularly applicable for use between the delivery end of a high-speed, web-fed perfecting press, and the receiving end of a counter-stacker of the type shown in our prior U.S. Pats. Nos. 3,117,500 and 3,327,597. Of course, the invention may be used between any two machines, or to convey papers around a corner for other purposes, where it is essential that the line of papers be delivered in shingle condition after turning the corner.

The invention finds its greatest utility in situations where crowded conditions make it impossible to locate the counter-stacker or second machine directly in line with the delivery conveyor of the press or first machine. In some cases, the first machine may have been installed with so little open space at its delivery end that the second machine must be placed parallel thereto, or around a corner therefrom. The second machine is synchronized to the speed of the first machine and it is essential that the line of papers received by the second machine be in shingle condition.

Heretofore, the only conveyors capable of transporting a shingled line of papers around a corner without disturbing the shingle have been so bulky that, in many cases, such conveyor has taken almost as much floor space as that required for the second machine.

SUMMARY OF THE INVENTION

It is therefore a primary object of this invention to provide a new and improved turning conveyor which is of relatively simple construction, accurate, reliable and trouble-free in operation, and adaptable to virtually any make or model of press, machine folder, collator, mailer, stitcher, or similar machine that delivers sheets of paper or other flexible material.

Another important object of the invention is to provide a turning conveyor which is extremely compact and requires an absolute minimum of floor space to make the turn.

A further object of the invention is to provide a turning conveyor of the class described which is alternatively driven from the associated machines for synchronization therewith and readily separable therefrom for use elsewhere.

A further object of the invention is to provide a new and improved apparatus for turning a continuous line of overlapping papers around a corner which exerts drag on the portions of the papers proximal to the corner and exerts a pull on the distal portions thereof for effecting turning of the papers in a small space.

Another object of the invention is to provide mechanisms for acceleratingly feeding the papers onto a conveyor and pressing them thereagainst to effect turning of the papers about a corner through a desired angle.

A further object of the invention is to provide new and improved mechanisms for holding papers down against a belt conveyor for better traction to bring the papers up to belt speed for accelerating turning thereof and aligning the papers with the direction of movement of the conveyor.

These and other objects and advantages of the present invention are achieved by the provision of a belt conveyor which receives a continuous line of overlapping papers spaced in the shingle condition and traveling along a line at an angle to the line of travel of the conveyor. Adjustable wheels riding on the papers, and a fulcrum device defining a corner, are associated with the conveyor and cooperate therewith to effect progressive turning of the papers and realignment to shingle condition. The papers are sequentially propelled onto the conveyor by an accelerating roller to dispose the major portion of each paper ahead of the corner. The fulcrum device has canted sides which engage one side edge of the papers for holding them down, and a ledge plate joined to the lower edges of the sides which hold the side edges spaced from the conveyor. In a modified form of the apparatus, the fulcrum device includes an adjustable pivot post which engages the papers after partial turning thereof for completing the turning of the papers.

BRIEF DESCRIPTION OF THE DRAWINGS

FIG. 1 is a plan view of an apparatus embodying the principles of the present invention, showing its relationship to a pair of angularly related conveyors fragmentarily shown, and illustrating the turning of a line of overlapping papers;

FIG. 2 is a fragmentary sectional view taken on line 2—2 in FIG. 1, illustrating the shingle of the papers fed to the apparatus;

FIG. 3 is an end view of the apparatus of FIG. 1, drawn to a slightly smaller scale than the latter;

FIG. 4 is a side elevational view, as seen at 4—4 in FIG. 1, also drawn to a slightly smaller scale than the latter;

FIG. 5 is an enlarged, fragmentary plan view of a portion of the apparatus of FIG. 1, showing the fulcrum device and ledge plate associated therewith;

FIG. 6 is a fragmentary perspective view, illustrating the canted fence of the fulcrum device and the relationship thereof and the ledge plate with respect to the belt conveyor;

FIG. 7 is an enlarged vertical sectional view, taken at 7—7 in FIG. 5;

DESCRIPTION OF THE PREFERRED EMBODIMENTS

Figure 8:
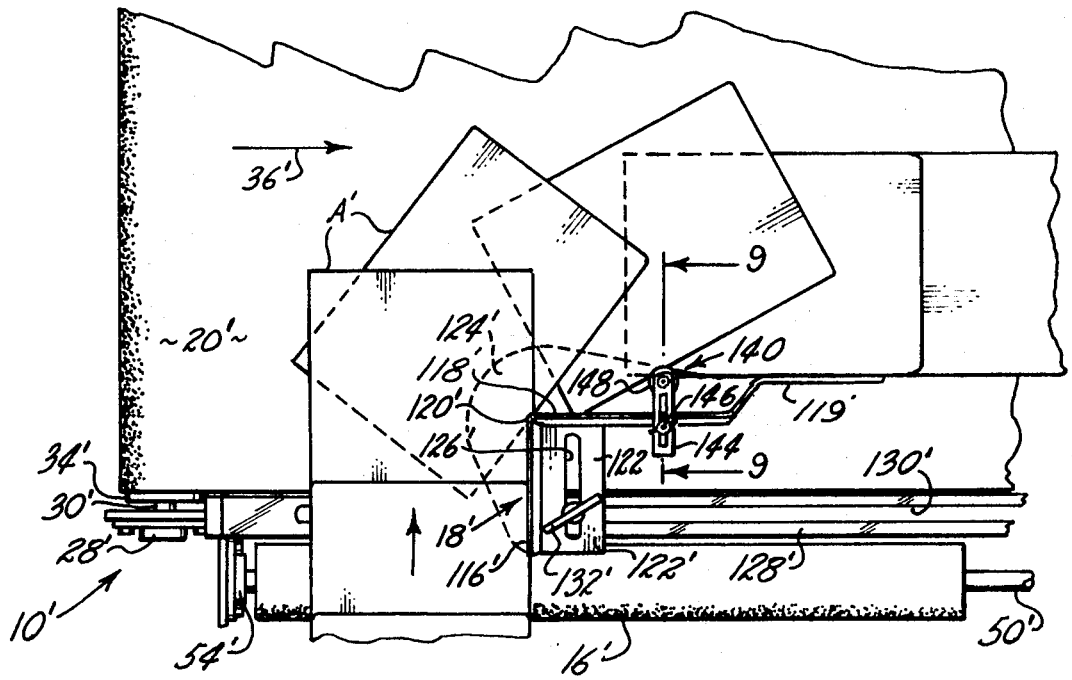
FIG. 8 is a fragmentary plan view of a modified form of fulcrum device in accordance with the present invention, illustrating the action thereof in effecting turning of the papers through a desired angle.

In FIG. 1 there is shown a turning apparatus 10 embodying the principles of the present invention, which receives a continuous line of overlapping articles, such as folded papers A, from a delivery conveyor 12, fragmentarily shown. The apparatus delivers the papers to a receiving conveyor 14 and includes an accelerating roller 16, a fulcrum device 18 and a belt conveyor 20, for progressively turning the papers around a corner and aligning them with the conveyor 14. Essentially, the papers are fed by the conveyor 12 to the roller 16 in shingle condition, as shown in FIG. 2, and the roller frictionally contacts the papers in sequence and slides each paper ahead of those behind and over those immediately ahead, so as to dispose at least the leading half of the slid paper ahead of the fulcrum device. As later described in greater detail, the frictional contact between the papers themselves, and the drag and pull exerted thereon by the fulcrum device 18 and belt conveyor 20, operate to effect the turning of the papers in a relatively small space in a reliable manner and deliver the papers in shingle condition to the conveyor 14.

The apparatus 10 also includes a rectangular frame 22 having adjustable legs 24 supported on a floor or other base 26, as shown in FIGS. 3 and 4. Secured to the ends of the frame are spaced pairs of bearings 28 in which parallel shafts 30 and 32 are supported for rotation. The shafts support a pair of crowned pulleys or rollers 34 about which the belt conveyor 20 is looped and adapted to be driven so that the upper run thereof travels in the direction of the arrow 36, as shown in FIG. 1.

Fixed to one end of frame 22 are spaced frame extensions 38 and 40, which extend toward the conveyor 14 and carry laterally projecting, coaxially aligned studs or posts 42. The frame extension 38 has an angular bracket-like configuration, and secured thereon is a bearing 44 in which one end of shaft 32 is journaled for rotation. Secured to shaft 32 is a bevel gear 46 which meshes with a second bevel gear 48 in one-to-one relation. Bevel gear 48 is fixed to one end of a rotary shaft 50 journaled in a bearing 52, secured to the frame extension 38 in right-angular relationship to the bearing 44. The other end of shaft 50 is journaled in a bearing 54 secured to the frame 22 to dispose the shaft generally parallel to the direction of travel of belt conveyor 20.

Roller 16 is supported on shaft 50 and has a diameter substantially equal to the diameter of the rollers 34 plus the thickness of the belt of conveyor 20, and because of the one-to-one gear relationship of the bevel gears 46 and 48, has a peripheral speed which is substantially equal to the speed of travel of the belt conveyor.

Also secured to shaft 32 is a sprocket 56 about which is trained a sprocket chain 58, the chain also being trained about a sprocket 60 secured to one end of a rotary shaft 62. Sprocket 60 is of larger size than sprocket 56, so that the speed of shaft 32 is approximately one-third faster than that of shaft 62. Shaft 62 is journaled in a pair of spaced bearings 64, which are mounted on a pair of upstanding vertical supports 66 secured to a transversely extending frame member 68 forming part of the conveyor 14, fragmentarily shown in FIG. 4. Secured to shaft 62 are pulleys 70 about which are trained belts 72, fragmentarily shown in FIG. 1. Shaft 62 is adapted to be driven in the manner disclosed in our aforementioned patents, so that the upper runs of the belts travel in the direction of arrow 74. The conveyor also has other pulley wheels (not shown) about which the belts are trained for suitable support thereof.

Member 68 is provided with upturned ends 75 and 76, between which frame extensions 38 and 40 fit, as shown in FIG. 1. The frame extension 40 is received between the end 75 and the adjacent support 66. The frame extension 38 is received between the end 76 and an upright 77, suitably spaced from the end and secured to the member 68. Each of the ends 75, 76 has a U-shaped slot 78 formed therein in which the coaxial studs 42 are adapted to seat, as shown in FIG. 4. Shaft 62 is mounted on member 68 so as to be substantially coaxial with studs 42, when they are seated in slots 78. This provides an adjustable pivotal connection between the frames of conveyors 14 and 20 for disposing the upper runs thereof as desired. The conveyors are readily disconnected by lowering member 68, or raising the extensions 38 and 40, and slipping the chain 58 off of the sprocket 60 and over the end of shaft 62.

Returning to FIG. 1, it will be seen that conveyor 12 includes a suitable frame 80, fragmentarily shown, on which bearings 82 are suitably mounted. The bearings journal a rotary shaft 84, and secured to the shaft are pulleys 86 about which belts 88, fragmentarily shown, are trained. It is understood, of course, that frame 80 also mounts other pulleys (not shown) about which the belts are trained and driven so that the upper runs thereof travel in the direction of arrow 89, which direction is at a right angle to the direction of travel of belt conveyor 20, shown by arrow 36 in FIG. 1. The delivery end of belt conveyor 12 is spaced from the accelerating roller 16, but is sufficiently close thereto so that the papers A bridge the gap therebetween.

Alternatively, the apparatus 10 can be driven from conveyor 12 by drivingly interconnecting the shafts 84 and 50 with a sprocket and chain system designated generally by reference numeral 90 and shown in phantom lines in FIG. 1. The chain of the system can be loosened for slipping it over the end of shaft 84 and quickly disconnecting the apparatus from the conveyor.

The speed of belts 88 of the conveyor 12 is synchronized with that of belts 72 of conveyor 14. The roller 16 operates to engage the underside of papers A in sequence and acceleratingly propel them onto conveyor 20, sliding each paper away from the papers behind and over the papers just ahead so that at least the leading half of the slid paper is disposed beyond the fulcrum device 18. The pull of the conveyor urges the paper against the fulcrum device and initiates the turning of the paper.

To ensure proper engagement between the papers A and the roller 16, pressure is applied to the papers by a wheel 92 riding on top of the papers. The wheel is disposed directly over the roller and is mounted for rotation on the free end of an adjustable arm 94 fixed to a sleeve 96. The sleeve is adjustably supported on a shaft 98 which has ends rotatably supported on a pair of upright brackets 100 mounted on frame 22.

Disposed over conveyor 20, downstream from arm 94, is a wheel 102 journaled on one end of a rod 103. The rod is received in a swingable arm 104 and is longitudinally and axially adjustable relative thereto. The arm is connected to a sleeve 106 adjustably supported on a transverse shaft 108, the ends of which are supported for rotation on inclined standards 110 secured to the frame extensions 38 and 40. Also swingably adjustably supported on shaft 108 is an adjustable arm 112, on the free end of which is journaled a wheel 114.

The purpose of wheels 102 and 114 is to press the papers against the belt conveyor 20 for bringing them up to belt speed and controlling their movement. As shown in FIG. 1, when the wheel 102 is positioned to pass over the leading outer corner of a paper, the paper is held on the conveyor and a quick pull or impulse is imparted to the paper which accelerates or speeds up the turning of its portion distal from the fulcrum device 18. Positioning the wheel more inwardly increases the speed of turning. The arm 112 is adjusted so that the wheel 114 engages the leading edge of the paper just as its side edge contacts the plate 118 and the paper is redisposed in shingle condition with the papers ahead. The wheel 114 is thus effective in preventing turning of the paper beyond a predetermined point and bringing the redisposed paper up to the speed of the belt conveyor 20. There is a tendency for the papers to ride or creep up the wheel 102 when it is vertically disposed, and for this reason, the wheel is canted to present an angle of attack preventing such creep up. The several adjustments of the wheels 102 and 114 provide for quick and easy positioning to effect orderly turning of the papers and realignment to shingle condition.

Inviting attention also to FIGS. 5 and 6, the fulcrum device 18 is seen to include side plates or fences 116 and 118, joined together at a corner 120, and defining a right-angle fence and fulcrum or pivot. The plates 116 and 118 extend upwardly from a rectangular support plate 122 and are canted to prevent creep up of the papers. At their lower edges the plates are joined to a horizontal plate or ledge 124 extending around the corner.

Support plate 122 has a longitudinal slot 126, and is mounted on an elongated plate member 128 secured to the side of frame 22 adjacent to the roller 16. Member 128 is disposed generally in the plane of the upper run of the conveyor 20 and has an elongated slot 130. As better seen in FIG. 7, a T-shaped bolt 132 with a threaded end 134 extends through the slots 126 and 130 and a spacer 135. Spacer 135 is disposed between plate 122 and member 128 and has a thickness sufficient to position the ledge plate 124 slightly above the conveyor 20 to prevent rubbing therebetween. Fixed to the T-bolt is a washer 136 which is engageable with the top of plate 122. Threadedly connected to the threaded end 134 is a nut 138 which is engageable with the underside of plate member 128. The nut is suitably held against rotation, whereby turning of the bolt draws the washer and nut together for locking the fulcrum device 18 in the desired position of adjustment, with the ledge plate 124 in proximity to the upper run of conveyor 20.

As shown in FIG. 1, the fulcrum device 18 is adjusted so the lower edge of plate 116 is slightly spaced from the right-hand edges of the papers A being fed by conveyor 12, and the corner 120 is over conveyor 20 with plate 118 extending downstream from the corner parallel to the direction of travel of the conveyor.

The operation of the apparatus of the present invention is believed to be self-evident from the foregoing description. With the conveyors 12, 14 and 20 and the accelerating roller 16 in operation, the papers A are fed by the conveyor 12 to conveyor 20 along a line of movement at right angles thereto, and with the right-hand edges of the papers slightly spaced from the canted fence side 116. As each paper fed by conveyor 12 passes over roller 16, its right-hand edge is over ledge plate 124, and when it reaches the position represented by paper P in FIG. 1, the underside thereof comes into frictional contact with the accelerating roller, whereupon the paper is accelerated and propelled ahead, sliding away from the papers behind and over the paper ahead, to a position represented by the paper designated P1. At P1, the leading edge of the typical paper is ahead of the corner 120 of the fulcrum device 18 by at least a half-length of the paper. The pull of the conveyor 20 urges the right-hand edge of the paper against the corner for initiating turning of the paper, and the corner exerts a drag on the paper's edge, with a consequent retardation of its movement. Because of the substantial perpendicularity between the directions of movement of the typical paper and the conveyor 20 at this point, there is considerable sliding of the paper relative to the conveyor. Ledge plate 124, which is interposed between conveyor 20 and the papers, reduces the pull of the conveyor on the portions of the papers proximate to the corner and exerts additional drag thereon. The drag exerted on the proximate portions of the papers combines with the pull of the conveyor on the distal portions thereof to create a varying force couple which commences progressive turning of the papers and causes the typical paper to slide along the corner to a position represented by the paper designated P2. It is to be noted that with progressive turning of the paper, the direction of travel of the paper becomes more and more aligned with the direction of travel of the conveyor 20, and the pull thereof on the paper becomes increasingly effective. In due course, the typical paper reaches a position represented by the paper designated P3, in which the canted wheel 102 rolls across the leading edge of the paper and presses it directly against the conveyor. This has the effect of imparting a quick pull thereto, causing the paper to speed up its turning and move through a position represented by the paper designated P4 to a position designated P5. At P5, the leading edge of the paper is engaged by wheel 114, whereby turning of the paper is stopped and the paper is brought up to belt speed. After position P5, the papers are redisposed in shingle condition in alignment with the direction of travel of conveyor 14.

It will be appreciated that during operation of the apparatus, the papers are in various positions from a shingle condition on conveyor 12, progressively turning on conveyor 20, which increases the original shingle, to back again in shingle condition with different spacing. However, as the papers reach conveyor 14, which runs at a speed coordinated with that of conveyor 12, the slower speed of belts 72, as compared with the speed of conveyor 20, causes the spacing between the papers to close up.

A modified form of the invention is illustrated in FIG. 8, to which attention is now invited. This second embodiment is designated in its entirety by the reference numeral 10', and is basically similar to apparatus 10 but omits the wheels thereof and has a modified fulcrum device 18'. The other parts, which are similar to those already described in the preceding embodiment, are designated by similar reference numerals with the prime (') suffix. It is understood, of course, that a conveyor system similar to conveyor 12 of FIG. 1 feeds overlapping articles A' onto an accelerating roller 16' which propels the articles in sequence onto a conveyor 20' traveling in the direction of the arrow 36'. The fulcrum device 18' is substantially similar to fulcrum device 18 of apparatus 10, and additionally includes an adjustable pivot post device 140. As shown in FIG. 8, fulcrum device 18' has upstanding plates 116' and 118', the latter being bent to provide an offset end portion 119'. The plates meet at a fulcrum corner 120' and are joined to a support plate 122' having a ledge plate 124'. The support plate has a slot 126' and is adjustably held in position on a plate 128' having a slot 130' by means under the control of a T-shaped bolt 132' so as to space the ledge plate from the conveyor and dispose the fulcrum corner as desired, the means being similar to that described in connection with the fulcrum device 18.

Figure 9:
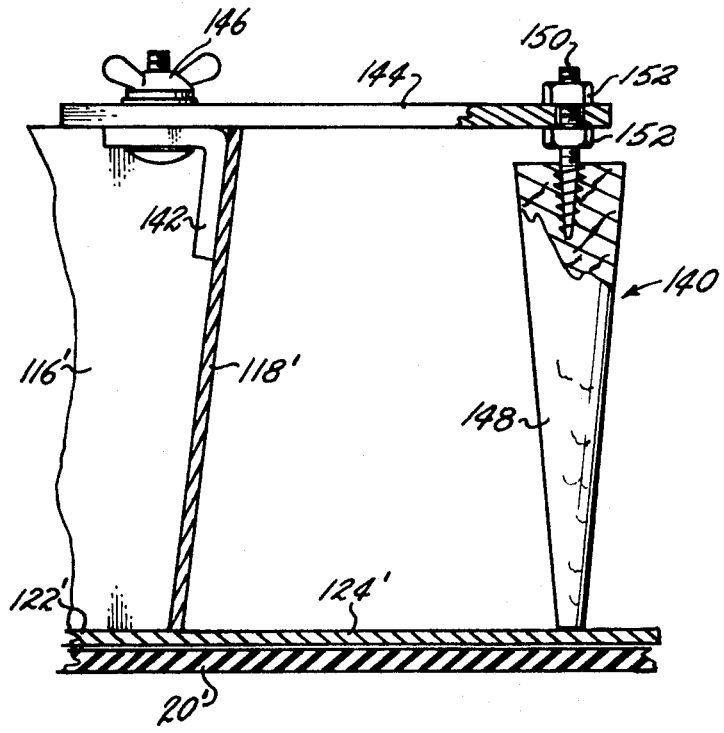
FIG. 9 is an enlarged vertical sectional view through the pivot post, along line 9—9 in FIG. 8.

As shown in FIG. 9, the side plate 118' has secured thereto an angular bracket 142 to which a slotted cantilever beam 144 is adjustably connected by a bolt and wing nut connection 146. Depending from the free end of the beam is a pivot post or fulcrum 148 of inverted frusto-conical shape having a stud screw 150 and a pair of nuts 152 for adjustably locking the post to the beam. The post is adjusted to engage the lower end thereof with the ledge plate 124'. The beam can be swung about the connection 146 as well as slid relative thereto for optimum positioning of the post. The slope of the post prevents creep up of the papers.

It is believed that the operation of the modified apparatus 10' is self-evident. The articles A', such as overlapping papers or the like, are fed in shingle condition to the accelerating roller 16' which propels them in sequence to dispose the leading half thereof ahead of the fulcrum corner 120'. The frictional contact between the overlapping articles and the conveyor 20' and the drag on the side edges of the articles by the corner 120' and ledge plate 124' serve to turn the articles through an angle which is short of placing the longitudinal axis of each article parallel to the direction of travel of the conveyor, indicated by arrow 36'. The side edges of the articles are then engaged by the pivot post 148 for further turning, and later by the end portion 119', to place the articles in linear alignment and shingle condition.

The conveyors 20 and 20' preferably have a width sufficient to accommodate a wide range of sizes of papers. Of course, the conveyors can be made narrower in the interests of compactness where the papers are of small size.

Thus, the present invention provides two forms of turn-in apparatus, each of which is highly effective for turning a continuous line of overlapping articles from one line of travel, around a corner through an angle, and delivering the overlapping articles in a new line of travel, such action taking place in a relatively small space.

The compactness of the present invention is an extremely important advantage, as there are innumerable instances where presses or like machines are crowded into restricted spaces, making it impossible to install another cooperating machine (such as a counter-stacker, for example) directly in line with the delivery conveyor to receive the papers therefrom. Such cooperating machines must be synchronized to the speed of the press, and it is usually necessary that the papers be shingled as they are received by the second machine. Prior to the present invention, there has never been a truly compact conveyor that would carry a shingled line of papers around a sharp, right-angle (or greater) corner, and deliver the line of papers, still shingled, to the second machine.

While we have shown and described in considerable detail what we believe to be the preferred embodiments of our invention, it will be understood by those skilled in the art that various changes may be made in the shape and arrangement of the several parts within the spirit of the invention as defined in the appended claims. For example, the apparatus can be constructed to deliver to the left, or be made reversible.

What is desired to secure by Letters Patent is:

1. Apparatus for conveying a continuous line of overlapping articles around a corner in a minimum of space, comprising:
   conveying means having a rectilinear direction of travel adapted to receive a continuous line of rectilinearly aligned overlapping articles at an angle and exerting a pull thereon in said direction of travel; and
   turning means cooperating with the pull of the conveying means for causing the overlapping articles to move in a curvilinear path through an arc equal to said angle, and turn during such curvilinear movement until the overlapping articles are rectilinearly aligned with the direction of travel of the conveying means;
   said turning means including acceleration means and fulcrum means, said acceleration means receiving the articles in shingle condition and propelling them sequentially onto the conveying means to dispose the major portion of each article in advance of the fulcrum means and increase the amount of shingle, the pull of the conveying means cooperating with the fulcrum means for effecting the turning of the overlapping articles during which the overlapping articles are caused to fan out and then returned to a shingle condition aligned with the direction of travel of the conveying means.

2. The apparatus of claim 1, in which the acceleration means includes a roller adapted to engage the undersides of the overlapping articles and accelerate them onto the conveying means transversely of the direction of travel thereof.

3. The apparatus of claim 1, in which the conveying means includes a belt conveyor receiving the overlapping articles, and the fulcrum means includes pivot means disposed over the belt conveyor and adjustable transversely and longitudinally of the belt conveyor for optimum disposition of the pivot means relative to the belt conveyor.

4. The apparatus of claim 3, further including additional pivot means spaced downstream of the first-named pivot means, and adjustable relative thereto.

5. Apparatus for transporting a line of shingled papers and conveying them around a corner without disturbing the shingle arrangement of the papers, said apparatus comprising:
   a first belt conveyor extending in a first direction and carrying a line of shingled papers thereon;
   a second belt conveyor disposed at an angle to said first belt conveyor and passing closely adjacent the delivery end of the latter, said first conveyor discharging its papers onto said second conveyor;
   fulcrum means positioned alongside one edge of the line of papers on said first conveyor, said fulcrum means being disposed above said second conveyor and adjacent the edge thereof nearest to the delivery end of said first conveyor;
   means for advancing the papers from the delivery end of said first conveyor onto said second conveyor, so that approximately half of each paper extends beyond said fulcrum means;
   said fulcrum means engaging one side edge of said paper at a point rearward of the midpoint thereof, and the leading end of said paper being pulled laterally by the frictional drag of said second conveyor while said paper pivots around said fulcrum means; and
   means engageable with the outer corner of each paper as it reaches a predetermined angular distance in its pivotal travel around said fulcrum means for accelerating the outer edge of the paper up to the belt speed of said second conveyor and causing said papers to align themselves parallel to the line travel of the second conveyor.

6. Apparatus as in claim 5, wherein said last-named means comprises a wheel running on said second conveyor and bearing downwardly against the same, said wheel being positioned to run over the outer corner of each paper as it pivots around said fulcrum means, and the pressure of said wheel causing the outer corner of each paper to increase its frictional grip on said second conveyor and to be accelerated thereby up to the belt speed of the conveyor.

7. Apparatus as in claim 5, which further comprises means for closing up the spacing between said papers after the line of papers has completed its turn around said fulcrum means, whereby the final spacing of the papers is substantially the same as the initial spacing in the line of papers on said first conveyor.

8. Apparatus as in claim 7, wherein said means for closing up the spacing between papers comprises a third conveyor belt disposed to receive papers from said second conveyor and traveling at a somewhat slower speed than the latter.

9. Apparatus as in claim 5, wherein said means for advancing the papers from the delivery end of the first conveyor onto the second conveyor comprises a roller positioned between the first conveyor and the second conveyor and driven at a higher surface speed than the belt speed of said first conveyor, said roller engaging the underside of each paper as it leaves the discharge end of the first conveyor, and frictionally driving the paper forward at an accelerated speed onto said second conveyor.

10. Apparatus as in claim 5, which further comprises a third conveyor disposed to receive the line of papers from said second conveyor, said first and third conveyors being driven at substantially the same speed, and said second conveyor being driven at a higher speed than said first and third conveyors;
   and an accelerating roller disposed between the delivery end of the first conveyor and the side edge of the second conveyor, said accelerating roller being adapted to engage the underside of the papers as they leave the first conveyor and accelerate the papers so that they are propelled out onto said second conveyor for a distance such that approximately half the width of the paper lies beyond said fulcrum means, where it is subject to the lateral pull of said second conveyor.

References Cited

UNITED STATES PATENTS

| | | | |
|---|---|---|---|
| 1,034,641 | 8/1912 | Parker | 198—20 |
| 2,227,202 | 12/1940 | Schmidt | 198—33(R2X) |
| 2,243,557 | 5/1941 | Finster | 198—20(X) |
| 2,767,666 | 10/1956 | Rhodes | 198—33(R2X) |

FOREIGN PATENTS

| | | | |
|---|---|---|---|
| 530,676 | 12/1940 | Great Britain | 198—33(R2) |

HARVEY C. HORNSBY, Primary Examiner

M. F. MAFFEI, Assistant Examiner

U.S. Cl. X.R.

198—33AB; 271—Digest 4